United States Patent
Kim et al.

(10) Patent No.: US 11,018,368 B2
(45) Date of Patent: May 25, 2021

(54) POUCH FORMING METHOD AND POUCH FORMING DEVICE

(71) Applicant: LG Chem, Ltd., Seoul (KR)

(72) Inventors: Gee Hwan Kim, Daejeon (KR); Sang Don Lee, Daejeon (KR); Min Seung Choi, Daejeon (KR); Sang Uk Yeo, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/281,798

(22) Filed: Feb. 21, 2019

(65) Prior Publication Data
US 2020/0153025 A1  May 14, 2020

(30) Foreign Application Priority Data

Nov. 9, 2018 (KR) .......................... 10-2018-0137484
Jan. 25, 2019 (KR) .......................... 10-2019-0010004

(51) Int. Cl.
*H01M 10/0585* (2010.01)
*H01M 10/647* (2014.01)
(Continued)

(52) U.S. Cl.
CPC ..... *H01M 10/0404* (2013.01); *H01M 10/049* (2013.01); *H01M 10/0585* (2013.01);
(Continued)

(58) Field of Classification Search
None
See application file for complete search history.

(56) References Cited

U.S. PATENT DOCUMENTS 3,147,722 A * 9/1964 Williamson ........... B21D 22/02
                                                    72/348
7,909,964 B2    3/2011 Nilsson et al.
(Continued)

FOREIGN PATENT DOCUMENTS

CN    202225265 U    5/2012
CN    104303330 A    1/2015
(Continued)

OTHER PUBLICATIONS

First Office Action issued in corresponding Chinese Application No. 201910126389.7, dated Oct. 22, 2019, 8 pages.
(Continued)

*Primary Examiner* — Amanda J Barrow
(74) *Attorney, Agent, or Firm* — Lerner, David, Littenberg, Krumholz & Mentlik, LLP

(57) ABSTRACT

A pouch forming method and a pouch forming device are provided. In particular, the pouch forming method for forming an accommodation part that accommodates an electrode assembly in a pouch sheet includes a seating process of seating the pouch sheet on a top surface of a lower die in which a forming groove is formed in an upper portion thereof. In a vacuum elongation process, a lower portion of the pouch sheet, in which the accommodation part is formed, is elongated by vacuum, and in an accommodation part formation process, the portion of the pouch sheet, which is elongated by the vacuum, is pressed by a punch disposed above the pouch sheet in a direction in which the forming groove is formed to form the accommodation part.

4 Claims, 18 Drawing Sheets

(51) Int. Cl.
- *H01M 10/04* (2006.01)
- *H01M 50/103* (2021.01)
- *H01M 50/116* (2021.01)
- *H01M 50/557* (2021.01)

(52) U.S. Cl.
CPC ....... *H01M 10/647* (2015.04); *H01M 50/103* (2021.01); *H01M 50/116* (2021.01); *H01M 50/557* (2021.01)

(56) References Cited

U.S. PATENT DOCUMENTS

| | | | |
|---|---|---|---|
| 8,246,784 B2 | 8/2012 | Nilsson et al. | |
| 9,300,006 B2 | 3/2016 | Kim et al. | |
| 9,548,517 B2 | 1/2017 | Kim et al. | |
| 9,636,731 B2 | 5/2017 | Yamamoto | |
| 2009/0139678 A1 | 6/2009 | Nilsson et al. | |
| 2011/0168346 A1 | 7/2011 | Nilsson et al. | |
| 2011/0287308 A1* | 11/2011 | Kim | H01M 2/0207 429/176 |
| 2013/0243548 A1 | 9/2013 | Yamamoto | |
| 2013/0252081 A1 | 9/2013 | Kim et al. | |
| 2014/0011070 A1 | 1/2014 | Kim et al. | |
| 2014/0304980 A1 | 10/2014 | Kim et al. | |
| 2014/0308577 A1* | 10/2014 | Kim | H01M 2/0202 429/186 |
| 2016/0181667 A1 | 6/2016 | Kim et al. | |
| 2017/0095860 A1* | 4/2017 | Nakatani | B22F 3/03 |
| 2017/0165897 A1* | 6/2017 | Saelen | B29C 51/087 |
| 2018/0169733 A1* | 6/2018 | Ishihara | B21C 47/10 |
| 2018/0243966 A1 | 8/2018 | Oh et al. | |
| 2018/0366690 A1* | 12/2018 | Levin | B21D 22/203 |

FOREIGN PATENT DOCUMENTS

| | | | | |
|---|---|---|---|---|
| CN | 104303332 A | | 1/2015 | |
| CN | 107234159 A | | 10/2017 | |
| CN | 107925019 A | | 4/2018 | |
| CN | 208101020 U | | 11/2018 | |
| JP | S48040071 B | | 11/1973 | |
| JP | S62218113 A | | 9/1987 | |
| JP | H11290960 A | | 10/1999 | |
| JP | 2002208383 A | * | 7/2002 | ............. H01M 2/02 |
| JP | 4980233 B2 | | 7/2012 | |
| JP | 2013188762 A | | 9/2013 | |
| JP | 2014083573 A | | 5/2014 | |
| JP | 2017196893 A | | 11/2017 | |
| KR | 10-2003-0004223 A | | 1/2003 | |
| KR | 20060011428 A | * | 2/2006 | |
| KR | 10-2006-0067809 | * | 6/2006 | ............. H01M 2/02 |
| KR | 10-2006-0067809 A | | 6/2006 | |
| KR | 10-2014-0015647 A | | 2/2014 | |
| KR | 10-2014-0104538 A | | 8/2014 | |
| KR | 20140104538 A | * | 8/2014 | |
| KR | 10-2015-0089556 A | | 8/2015 | |
| KR | 20170108846 A | * | 9/2017 | ............. B29C 51/10 |
| KR | 10-2017-0124882 A | | 11/2017 | |
| KR | 20170124882 A | * | 11/2017 | ............. B29C 43/20 |
| KR | 10-2018-0082890 A | | 7/2018 | |
| KR | 10-2018-0102927 A | | 9/2018 | |
| WO | 2015/045797 A1 | | 4/2015 | |

OTHER PUBLICATIONS

European Search Report issued in corresponding European Application No. 19157576.0, dated Oct. 4, 2019, 7 pages.

* cited by examiner

○ : NON-OCCURRENCE   ● : OCCURRENCE

| PUNCH DEPTH (mm) | WRINKLE OCCURRENCE | | CRACK OCCURRENCE | |
|---|---|---|---|---|
| | COMPARATIVE EXAMPLE 1 | MANUFACTURING EXAMPLE 1 | COMPARATIVE EXAMPLE 1 | MANUFACTURING EXAMPLE 1 |
| 7 | ○ | ○ | ○ | ○ |
| 8 | ● | ○ | ● | ○ |
| 9 | ● | ○ | ● | ○ |
| 10 | ● | ● | ● | ● |
| 11 | ● | ● | ● | ● |
| 12 | ● | ● | ● | ● |
| 13 | ● | ● | ● | ● |

FIG. 18

○:NON-OCCURRENCE  ●:OCCURRENCE

| PUNCH DEPTH (mm) | WRINKLE OCCURRENCE | | CRACK OCCURRENCE | |
|---|---|---|---|---|
| | COMPARATIVE EXAMPLE 1 | MANUFACTURING EXAMPLE 1 | COMPARATIVE EXAMPLE 1 | MANUFACTURING EXAMPLE 1 |
| 7 | ○ | ○ | ○ | ○ |
| 8 | ● | ○ | ● | ○ |
| 9 | ● | ○ | ● | ○ |
| 10 | ● | ○ | ● | ○ |
| 11 | ● | ○ | ● | ○ |
| 12 | ● | ○ | ● | ○ |
| 13 | ● | ● | ● | ● |

FIG.19

POUCH FORMING METHOD AND POUCH FORMING DEVICE

CROSS-REFERENCE TO RELATED APPLICATIONS

The present application claims the benefit of the priority of Korean Patent Application Nos. 10-2018-0137484 filed on Nov. 9, 2018 and 10-2019-0010004 filed on Jan. 25, 2019, which are hereby incorporated by reference in their entirety.

BACKGROUND

Field of the Invention

The present invention relates to a pouch forming method and a pouch forming device for secondary batteries.

Description of the Related Art

Secondary batteries are rechargeable unlike primarily batteries, and also, the possibility of implementing in a compact size and a high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries depending on a shape of a battery case. In such a secondary battery, an electrode assembly mounted in a battery case is a chargeable and dischargeable power generating device having a structure in which an electrode and a separator are stacked.

The electrode assembly may be broadly classified into a jelly-roll type electrode assembly in which a separator is interposed between a positive electrode and a negative electrode, each of which is provided as a form of a sheet coated with an active material, and then, the positive electrode, the separator, and the negative electrode are wound; a stacked type electrode assembly in which a plurality of positive and negative electrodes with a separator therebetween are sequentially stacked; and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, reduced weight, improved formability, and the like, and thus, its usage is gradually increasing.

However, in the process of forming the accommodation part in a pouch sheet that accommodates the electrode assembly to manufacture the secondary battery, a large amount of cracks occur in a portion at which the pouch sheet is formed.

SUMMARY

An aspect of the prevent invention is to provide a pouch forming method and device, which are capable of preventing cracks from occurring when an accommodation part that accommodates an electrode assembly is formed in a pouch sheet.

According to an aspect of the present invention, a pouch forming method for forming an accommodation part that accommodates an electrode assembly in a pouch sheet may include a seating process of seating the pouch sheet on a top surface of a lower die in which a forming groove is formed in an upper portion thereof; a vacuum elongation process of elongating a lower portion of the pouch sheet, in which the accommodation part is formed, by vacuum; and an accommodation part formation process of pressing the portion of the pouch sheet, which is elongated by the vacuum, using a punch disposed above the pouch sheet in a direction in which the forming groove is formed to form the accommodation part.

According to another aspect of the present invention, a pouch forming device for forming an accommodation part that accommodates an electrode assembly in a pouch sheet may include a lower die which is disposed on a lower portion of the pouch sheet and in which a forming groove is formed in an upper portion thereof; a punch unit disposed above the pouch sheet and comprising a punch that is configured to press the pouch sheet in a direction of the forming groove of the lower die to form the accommodation part in the pouch sheet in a shape that corresponds to the forming groove; and a vacuum unit connected to the forming groove of the lower side to apply vacuum to the pouch sheet seated on a top surface of the lower die to elongate the forming portion of the pouch sheet.

BRIEF DESCRIPTION OF THE DRAWINGS

The above and other aspects, features and other advantages of the present invention will be more clearly understood from the following detailed description taken in conjunction with the accompanying drawings, in which:

FIG. 18 is a table showing results obtained from Experimental Example 1 in a pouch forming device according to a fourth exemplary embodiment of the present invention; and FIG. 19 is a table showing results obtained from Experimental Example 2 in a pouch forming device according to a fifth exemplary embodiment of the present invention.

DETAILED DESCRIPTION

Figure 1:
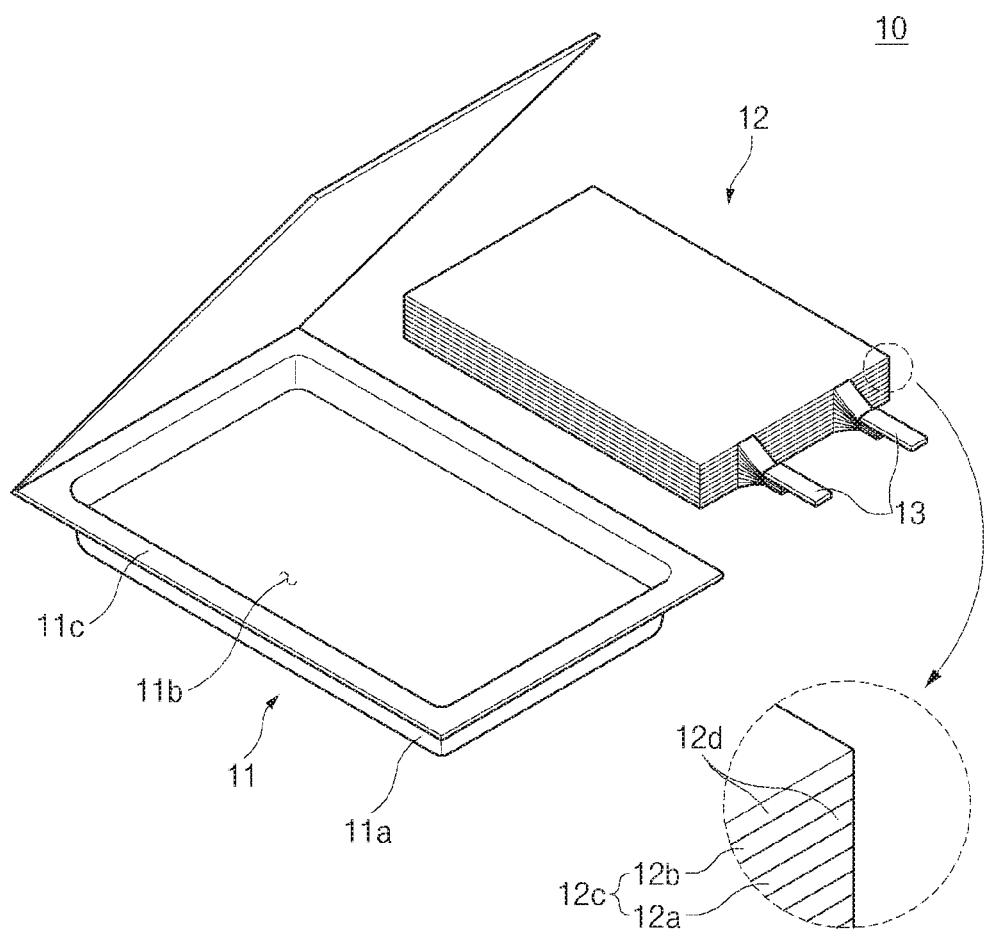
FIG. 1 is an exploded perspective view of a secondary battery to which a pouch sheet formed through a pouch forming method is applied according to a first exemplary embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. In addition, the present invention may be embodied in different forms and should not be construed as limited to the exemplary embodiments set forth herein. In the following description of the present invention, the detailed descriptions of related arts which may unnecessarily obscure the gist of the present invention will be omitted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
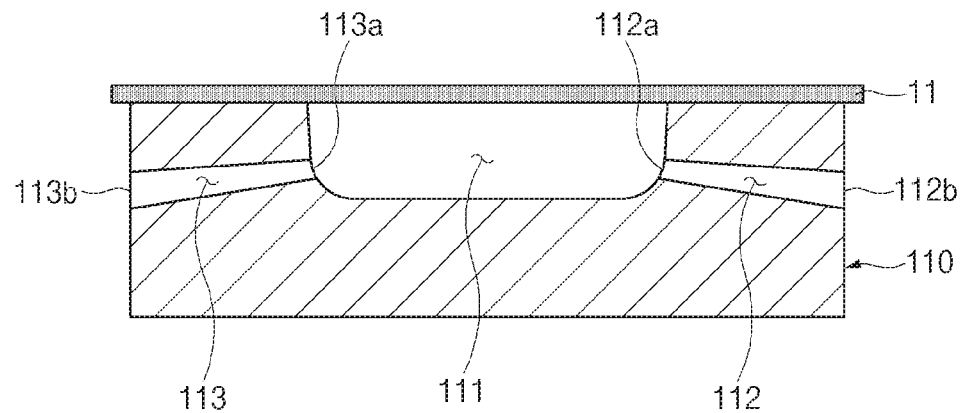
FIG. 2 is a cross-sectional view illustrating an example of a seating process in the pouch forming method according to the first exemplary embodiment of the present invention.
Figure 3:
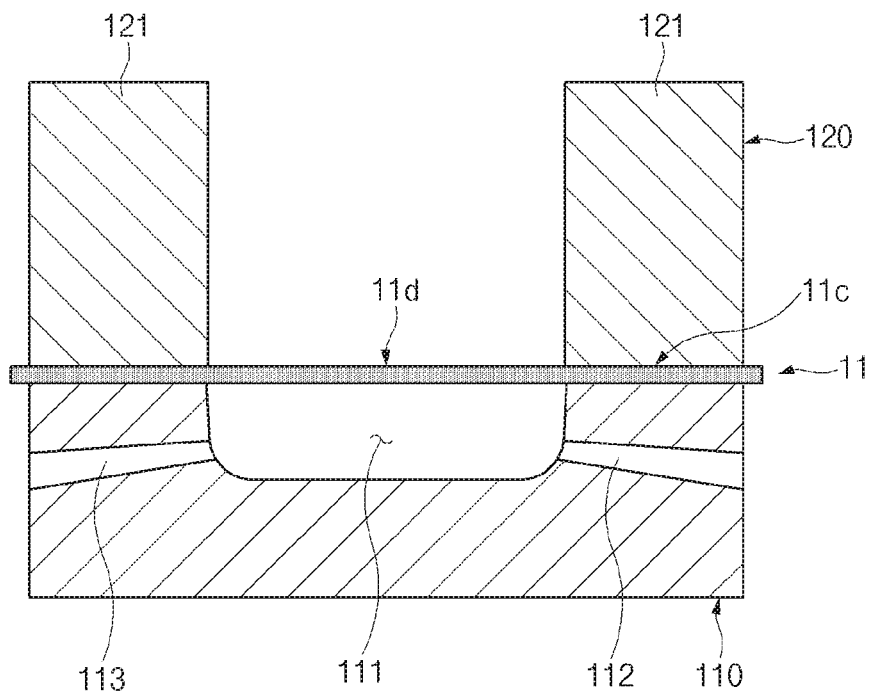
FIG. 3 is a cross-sectional view illustrating an example of a pouch supporting process in the pouch forming method according to the first exemplary embodiment of the present invention.
Figure 4:
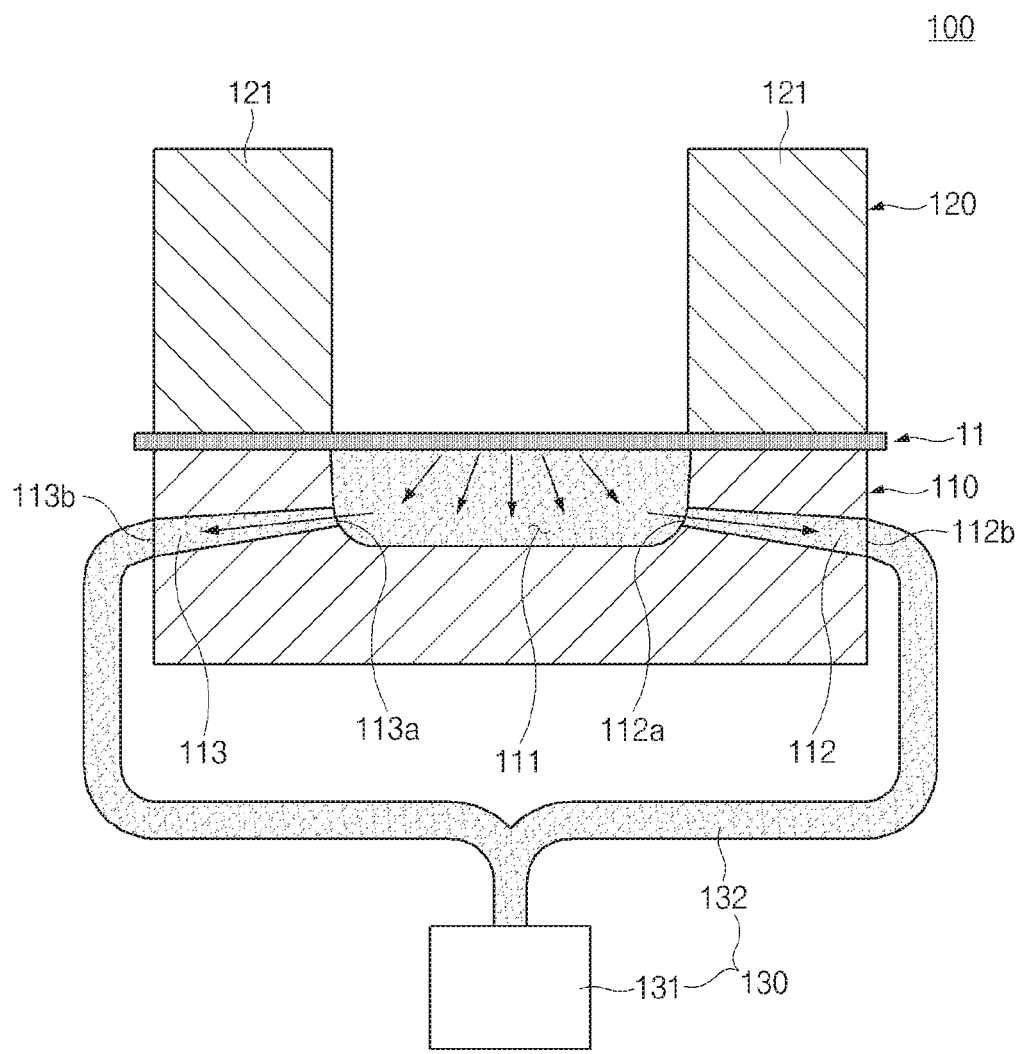
FIG. 4 is a cross-sectional view illustrating a vacuum elongation process in the pouch forming method according to the first exemplary embodiment of the present invention.
Figure 5:
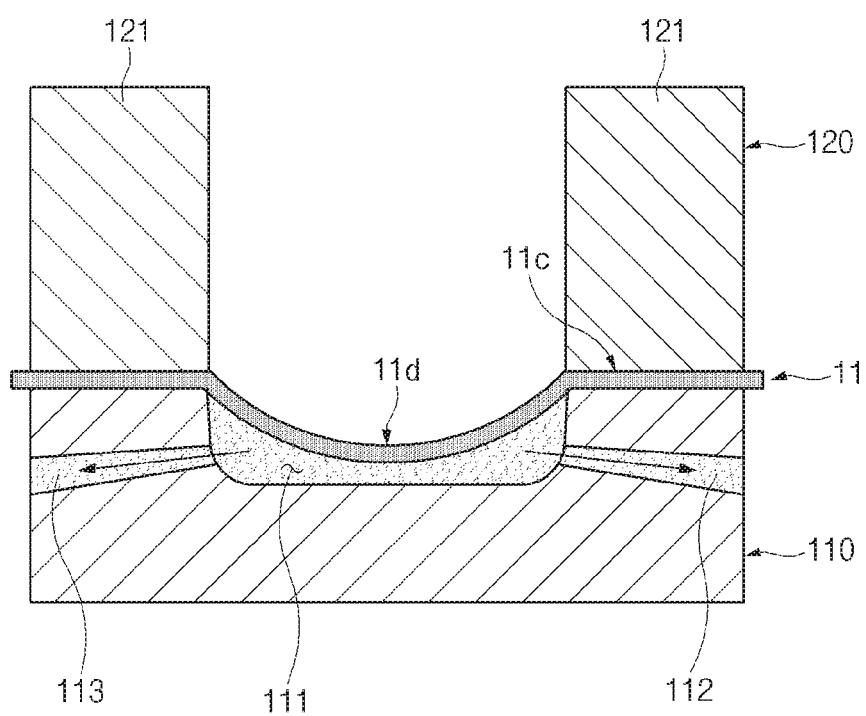
FIG. 5 is a cross-sectional view illustrating an example of a state in which the pouch sheet is elongated through the vacuum elongation process in the pouch forming method according to the first exemplary embodiment of the present invention.
Figure 6:
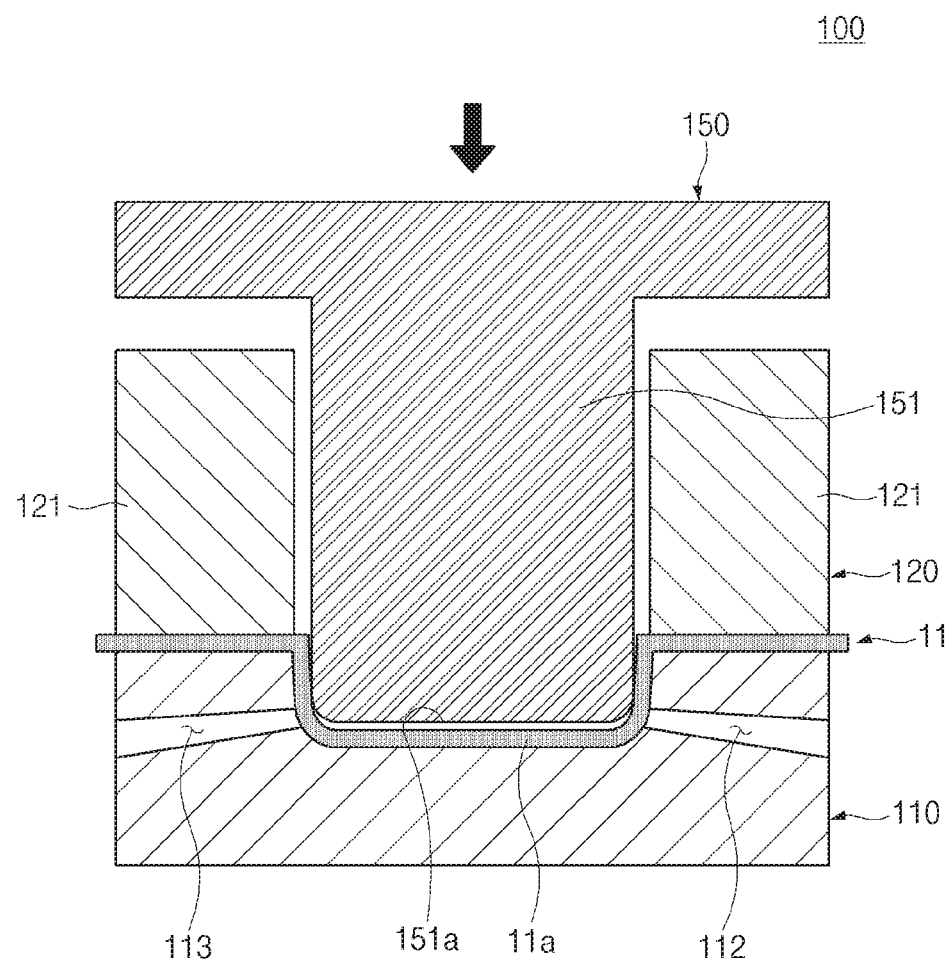
FIG. 6 is a cross-sectional view illustrating an example of an accommodation part formation process in the pouch forming method according to the first exemplary embodiment of the present invention.

FIG. 1 is an exploded perspective view of a secondary battery to which a pouch sheet formed through a pouch forming method is applied according to a first exemplary embodiment of the present invention, FIG. 2 is a cross-sectional view illustrating an example of a seating process in the pouch forming method according to the first exemplary embodiment of the present invention, and FIG. 3 is a cross-sectional view illustrating an example of a pouch supporting process in the pouch forming method according to the first exemplary embodiment of the present invention. FIG. 4 is a cross-sectional view illustrating a vacuum elongation process in the pouch forming method according to the first exemplary embodiment of the present invention, FIG. 5 is a cross-sectional view illustrating an example of a state in which the pouch sheet is elongated through the vacuum elongation process in the pouch forming method according to the first exemplary embodiment of the present invention, and FIG. 6 is a cross-sectional view illustrating an example of an accommodation part formation process in the pouch forming method according to the first exemplary embodiment of the present invention.

Referring to FIGS. 1 to 5, a pouch forming method for forming an accommodation part 11*b* that accommodates an electrode assembly 12 in a pouch sheet 11 according to a first exemplary embodiment of the present invention may comprise a seating process of seating the pouch sheet 11 on a lower die (e.g., a bottom die) 110 in which a forming groove 111 is formed, a vacuum elongation process of elongating a portion of the pouch sheet 11, in which the accommodation part 11*b* is formed, by vacuum, and an accommodation part formation process of pressing the portion of the pouch sheet, which is elongated by the vacuum, using a punch 151 to form the accommodation part 11*b*. The pouch forming method according to the first exemplary embodiment of the present invention may further comprise a pouch supporting process supporting the pouch sheet 11 on the lower die 110 prior to the vacuum elongation process is performed.

Hereinafter, the pouch forming method according to the first exemplary embodiment of the present invention will be described in more detail with reference to FIGS. 1 to 7. Referring to FIG. 2, in the seating process, the pouch sheet 11 may be seated on a top surface of the lower die 110 in which a forming groove 111 is formed in an upper portion thereof. The pouch sheet 11 may cover an upper portion of the forming groove 111 of the lower die 110 to seal the forming groove 111. The pouch sheet 11 may include, for example, a sheet made of aluminum (Al).

Referring to FIG. 3, in the pouch supporting process, before the vacuum elongation process is performed, an outer portion 11*c* of the accommodation part 11*b* in the pouch sheet 11 may be pressed by a stripper 121 disposed above the pouch sheet 11 to support the pouch sheet 11 to the lower die 110 and to fix the pouch sheet 11. A stripper unit 120 may include the stripper 121 and a stripper moving part that allows the stripper 121 to move (see FIG. 1). Thus, when the accommodation part 11 is formed by pressing the pouch sheet 11 through an accommodation part formation process that will be described below, the pouch sheet 11 may be prevented from moving.

Referring to FIGS. 1, 4, and 5, in the vacuum elongation process, the lower portion of the pouch sheet 11, in which the accommodation part 11b is formed, may be elongated by vacuum. In addition, in the vacuum elongation process, a space of the forming groove 111 may be vacuumized through vacuum passages 112 and 113 connected to the forming groove 111 in the lower die 110 to elongate a portion of the pouch sheet 11, which faces the forming groove 111. Furthermore, in the vacuum elongation process, the space of the forming groove 111 may be vacuumized through suction apertures 112a and 113a of the vacuum passages 112 and 113 formed in plurality along a lower portion of a side surface of the forming groove 111 to elongate a forming portion 11d of the pouch sheet 11. During the vacuum elongation process, for example, the space of the forming groove 111 may be vacuumized by a vacuum unit 130 for 0.1 seconds to 0.2 seconds. When the vacuum elongation process is performed prior to the accommodation part formation process, elongation efficiency may be improved. In other words, when the pouch sheet 11 is elongated by the vacuum during the vacuum elongation process, the elongation efficiency may be improved compared to a case in which the pouch sheet 11 is elongated by the vacuum during the accommodation part formation process.

Figure 7:
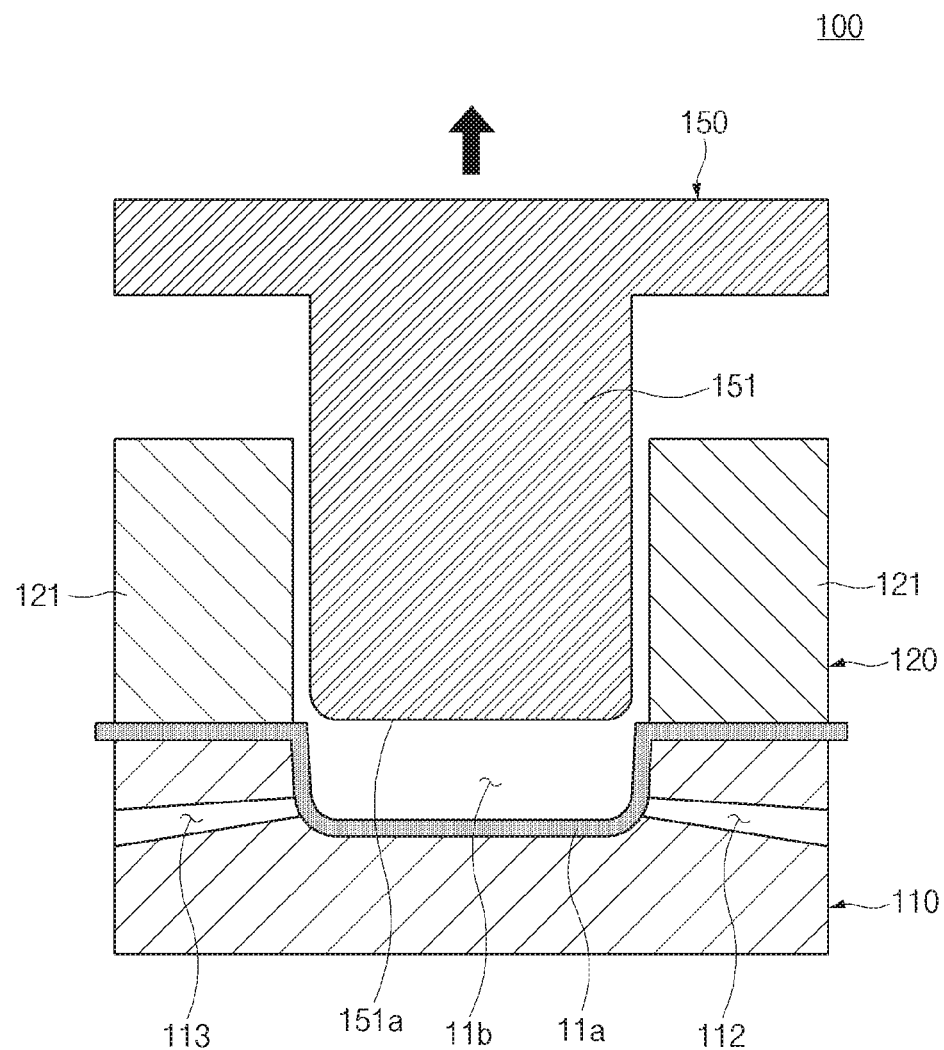
FIG. 7 is a cross-sectional view illustrating an example of a state in which an accommodation part is formed in the pouch sheet through the accommodation part formation process in the pouch forming method according to the first exemplary embodiment of the present invention.

FIG. 7 is a cross-sectional view illustrating an example of a state in which an accommodation part is formed in the pouch sheet through the accommodation part formation process in the pouch forming method according to the first exemplary embodiment of the present invention. Referring to FIGS. 6 and 7, in the accommodation part formation process, the portion of the pouch sheet 11, which is elongated by the vacuum, may be pressed by a punch 151 disposed above the pouch sheet 11 in a direction, in which the forming groove 111 is formed, to form the accommodation part 11b. The pouch sheet 11 may include a body 11a having a shape that is downwardly convex due to the punch 151. A punch unit 150 may include the punch 151 and the punch moving part that allows the punch 151 to move. Further, in the accommodation part formation process, the pouch sheet 11 may be pressed by the punch 151 to form the accommodation part 11b with a depth, for example, 7 mm to 8 mm in the pouch sheet 11.

Referring to FIGS. 4 to 7, in the above-described pouch forming method according to the first exemplary embodiment of the present invention, the forming portion 11d in which the accommodation part is formed may be elongated by the vacuum prior to the accommodation part 11b is formed in the pouch sheet 11. Thus, when the punch 151 is pressed to form the pouch sheet 11, occurrence of cracks in the forming portion may be prevented.

Figure 8:
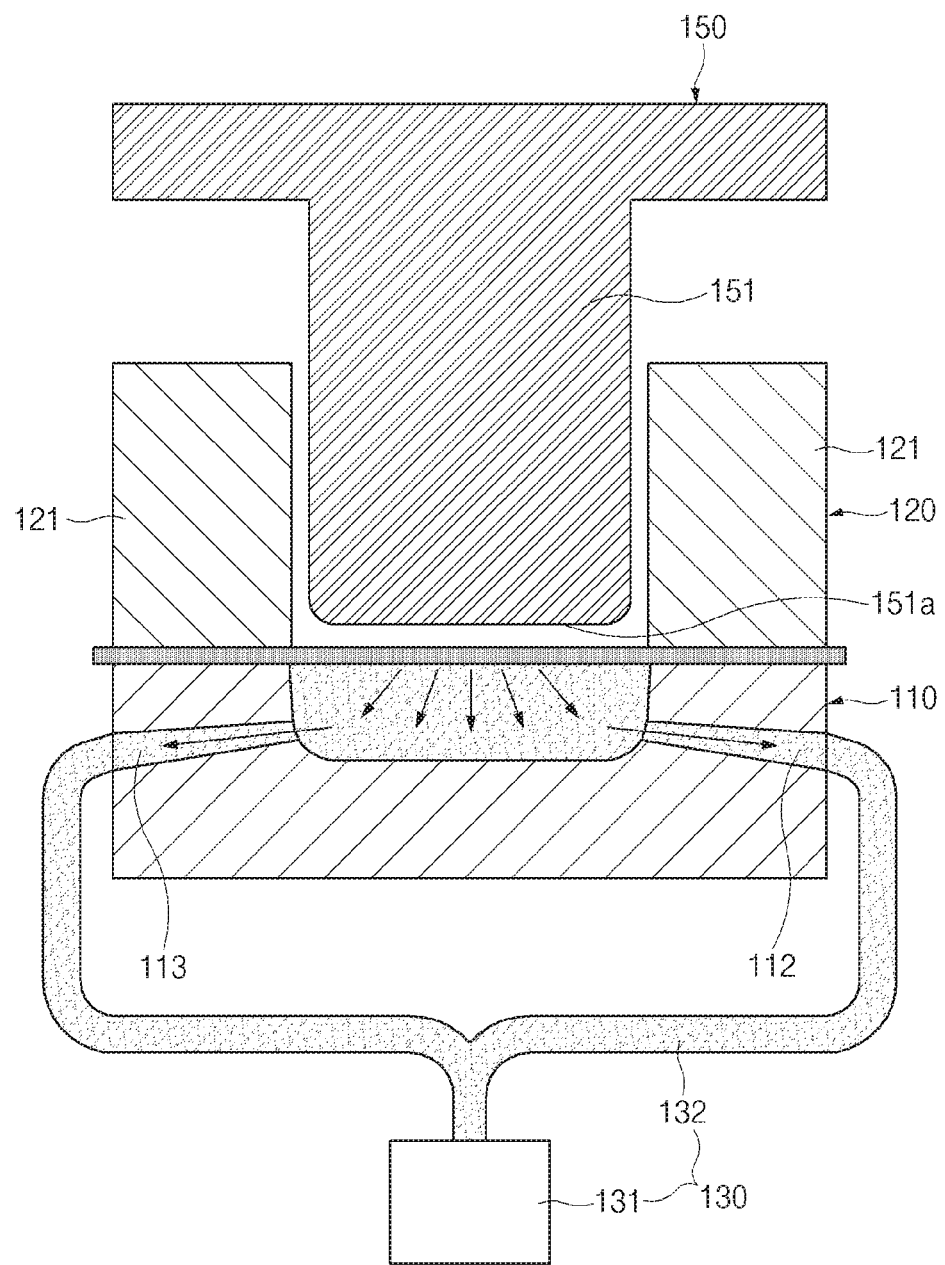
FIG. 8 is a cross-sectional view illustrating a vacuum elongation process in a pouch forming method according to a second exemplary embodiment of the present invention.
Figure 9:
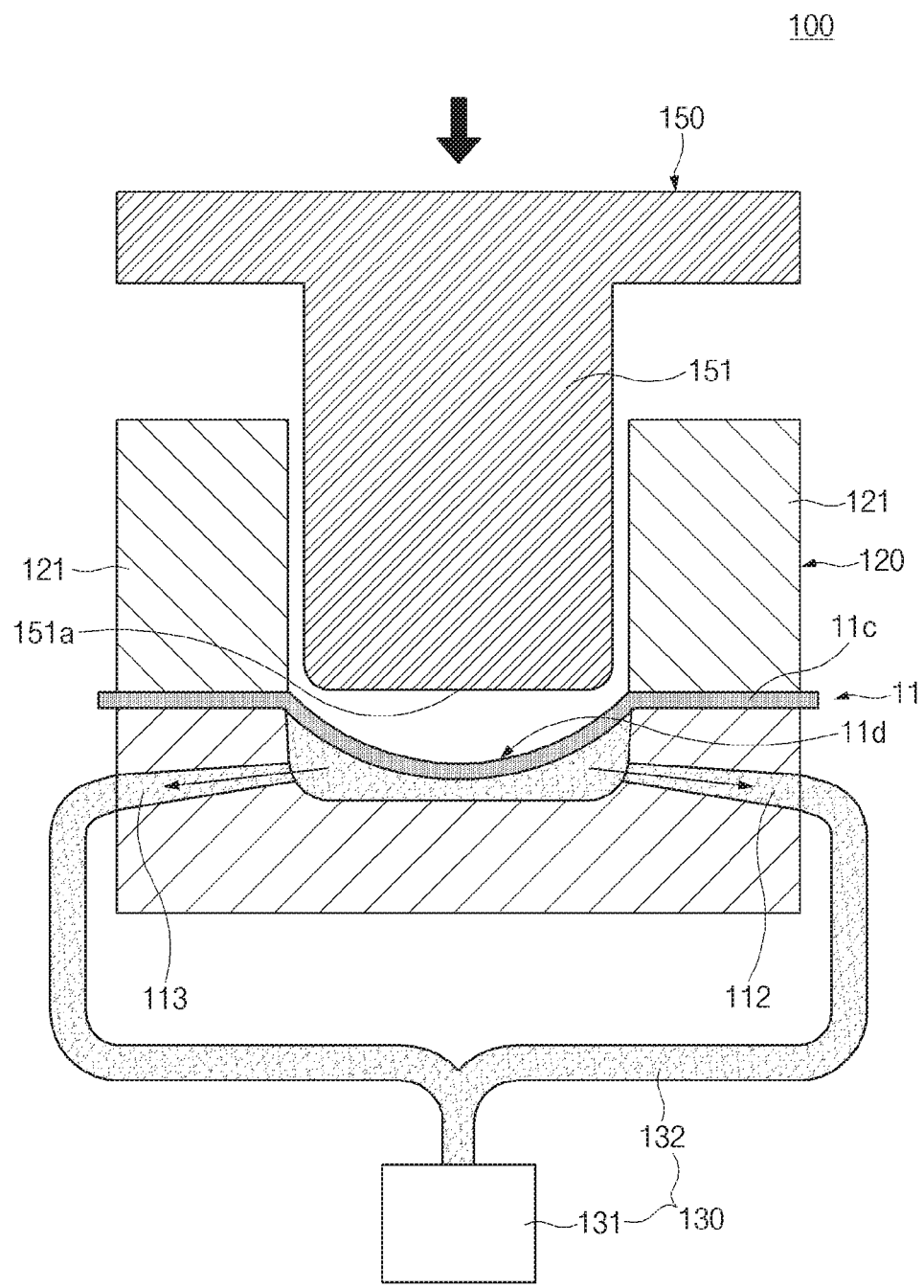
FIG. 9 is a cross-sectional view illustrating an example of a state in which a pouch sheet is elongated through the vacuum elongation process in the pouch forming method according to the second exemplary embodiment of the present invention.
Figure 10:
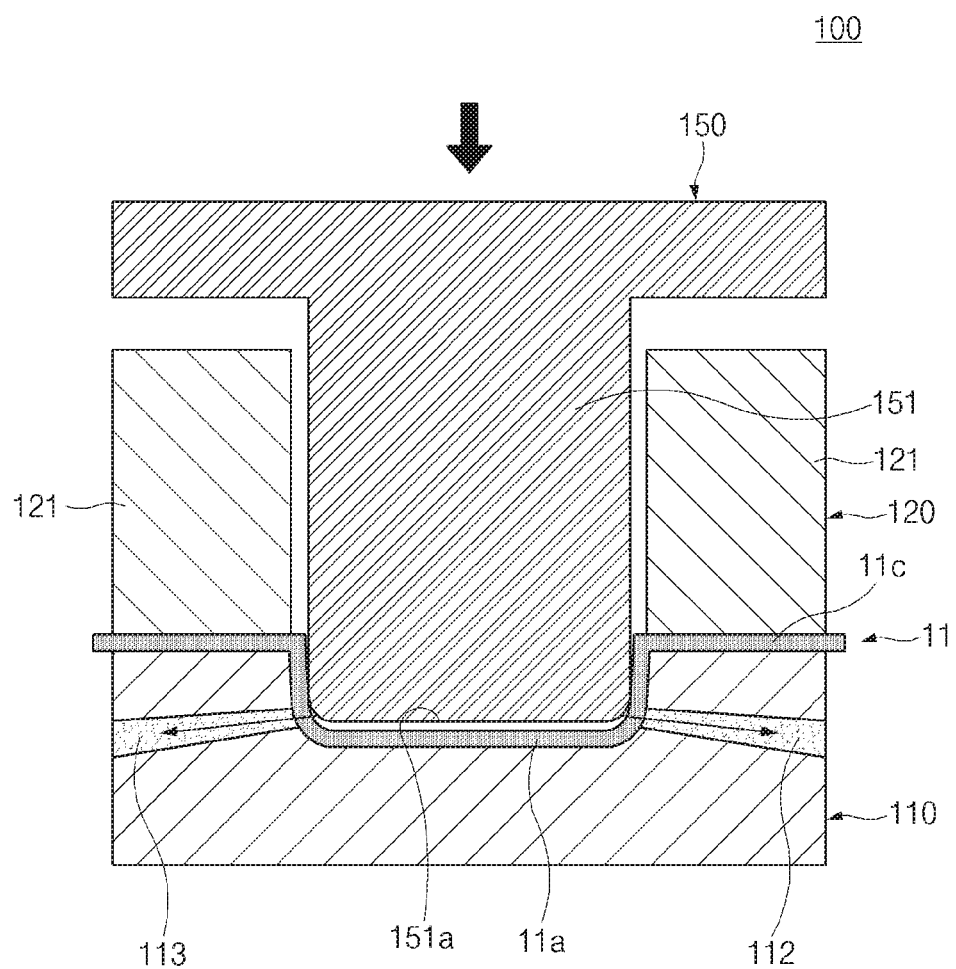
FIG. 10 is a cross-sectional view illustrating an example of a state in which an accommodation part is formed in the pouch sheet through the vacuum elongation process and an accommodation part formation process in the pouch forming method according to the second exemplary embodiment of the present invention.
Figure 11:
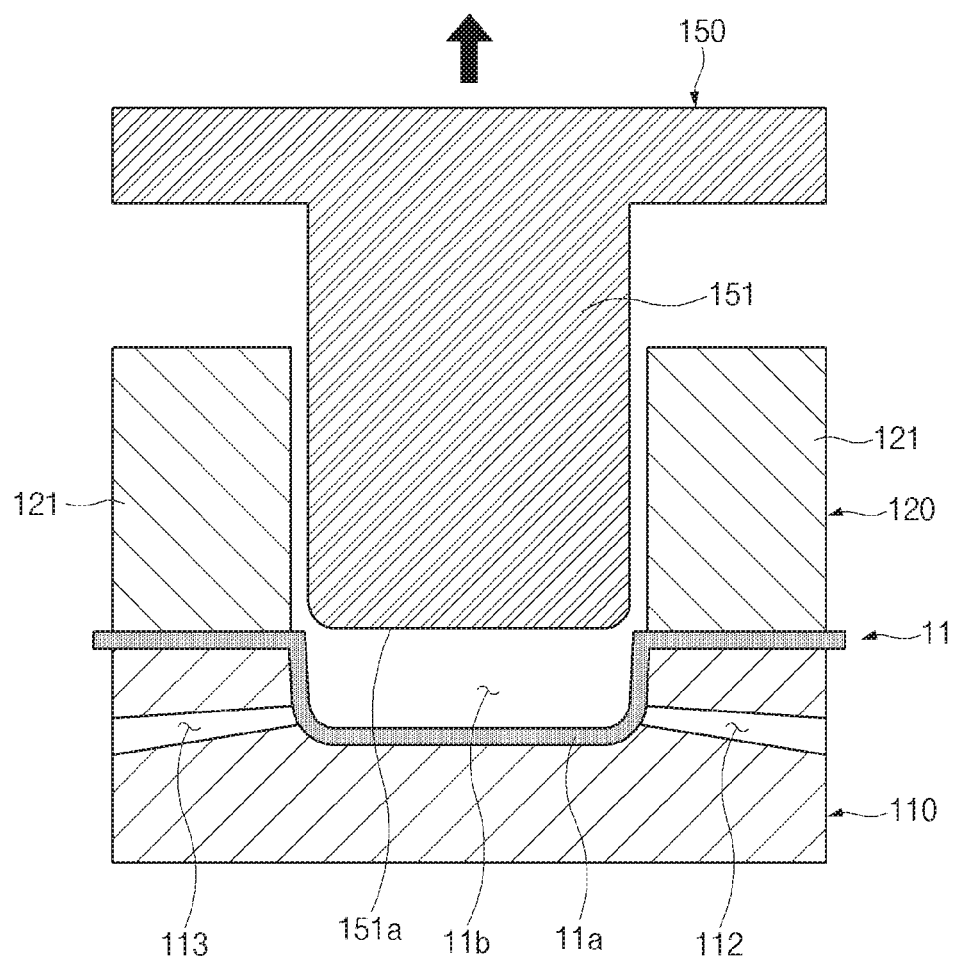
FIG. 11 is a cross-sectional view illustrating an example of a state in which the accommodation part is formed after the vacuum elongation process and the accommodation part formation process in the pouch forming method according to the second exemplary embodiment of the present invention.

Hereinafter, a pouch forming method according to a second exemplary embodiment of the present invention will be described. FIG. 8 is a cross-sectional view illustrating a vacuum elongation process in a pouch forming method according to a second exemplary embodiment of the present invention, and FIG. 9 is a cross-sectional view illustrating an example of a state in which a pouch sheet is elongated through the vacuum elongation process in the pouch forming method according to the second exemplary embodiment of the present invention. FIG. 10 is a cross-sectional view illustrating an example of a state in which an accommodation part is formed in the pouch sheet through the vacuum elongation process and an accommodation part formation process in the pouch forming method according to the second exemplary embodiment of the present invention, and FIG. 11 is a cross-sectional view illustrating an example of a state in which the accommodation part is formed after the vacuum elongation process and the accommodation part formation process in the pouch forming method according to the second exemplary embodiment of the present invention.

Referring to FIGS. 8 to 11, a pouch forming method for forming an accommodation part 11b that accommodates an electrode assembly in a pouch sheet 11 according to a second exemplary embodiment of the present invention may comprise a seating process of seating the pouch sheet 11 on a lower die 110 in which a forming groove 111 is formed, a pouch supporting process of supporting the pouch sheet 11 on the lower die 110, a vacuum elongation process of elongating a portion of the pouch sheet 11, in which the accommodation part 11b is formed, by vacuum, and an accommodation part formation process of pressing the portion of the pouch sheet, which is elongated by the vacuum, using a punch 151 to form the accommodation part 11b. The vacuum elongation process and the accommodation formation process may be performed simultaneously.

The pouch forming method according to the second exemplary embodiment of the present invention is different from the pouch forming method according to the foregoing first exemplary embodiment of the present invention in that the vacuum elongation process and the accommodation formation process are performed simultaneously. Thus, contents of this exemplary embodiment, which are duplicated with those according to the foregoing first exemplary embodiment, will be briefly described, and also, differences therebetween will be mainly described.

In more detail, in the vacuum elongation process of the pouch forming method according to the second exemplary embodiment of the present invention, a lower portion of the pouch sheet 11, in which the accommodation part 11b is formed, may be elongated by vacuum. Further, in the vacuum elongation process, a space of the forming groove 111 may be vacuumized through vacuum passages 112 and 113 connected to the forming groove 111 in the lower die 110 to elongate a portion of the pouch sheet 11, which faces the forming groove 111. In addition, in the accommodation part formation process, the portion of the pouch sheet 11, which is elongated by the vacuum, may be pressed by a punch 151 disposed above the pouch sheet 11 in a direction, in which the forming groove 111 is formed, to form the accommodation part 11b.

In the pouch forming method according to the second exemplary embodiment of the present invention, the vacuum elongation process and the accommodation part formation process may be performed simultaneously. In other words, in the pouch forming method according to the second exemplary embodiment of the present invention, the vacuum may be applied to press the pouch sheet by the punch while elongating the pouch sheet 11, thereby forming the accommodation part 11b. Thus, the vacuum elongation process and the accommodation part formation process may be performed simultaneously to reduce a manufacturing time.

Figure 12:
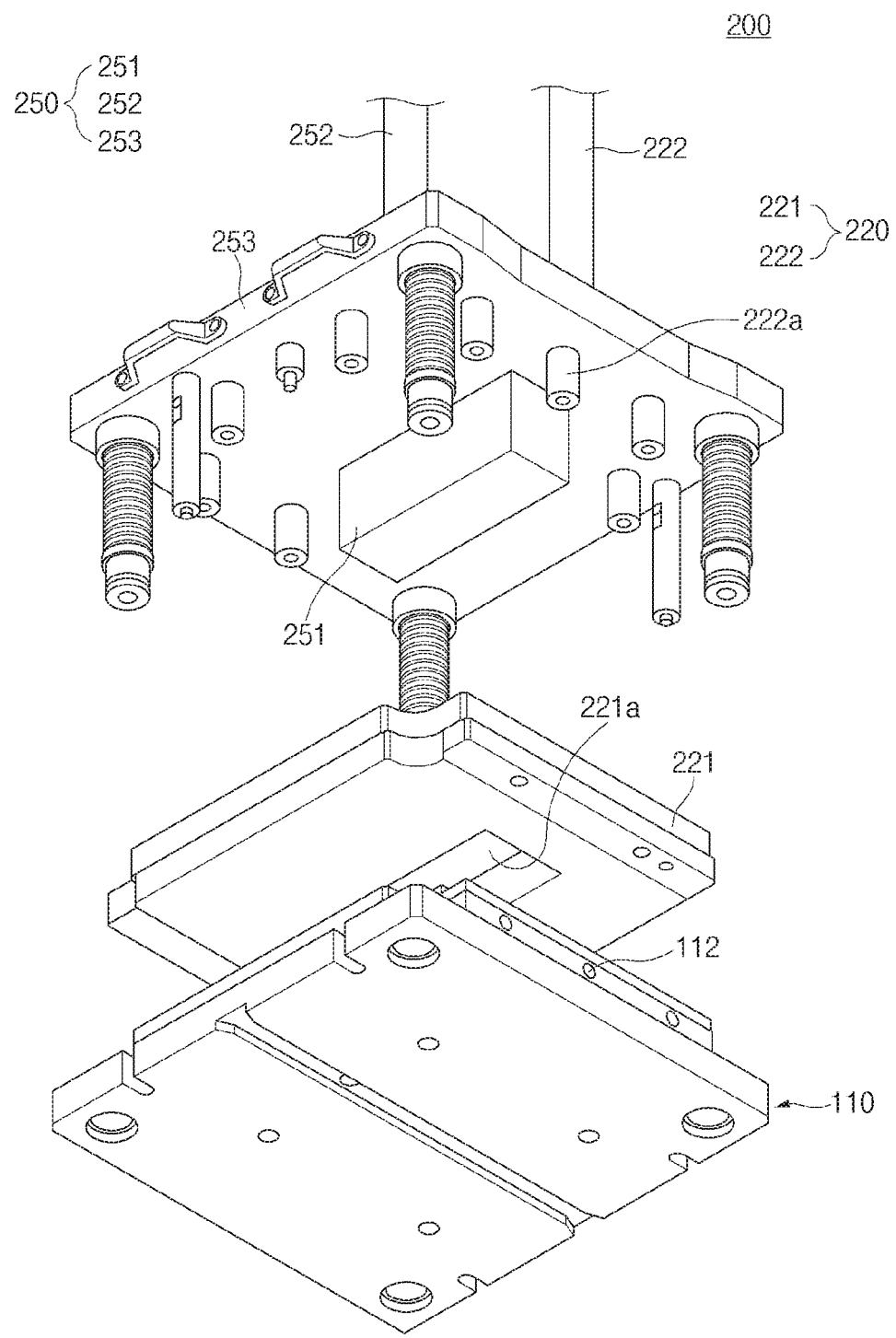
FIG. 12 is an exploded perspective view illustrating an example of a pouch forming device used in a pouch forming method according to a third exemplary embodiment of the present invention.
Figure 13:
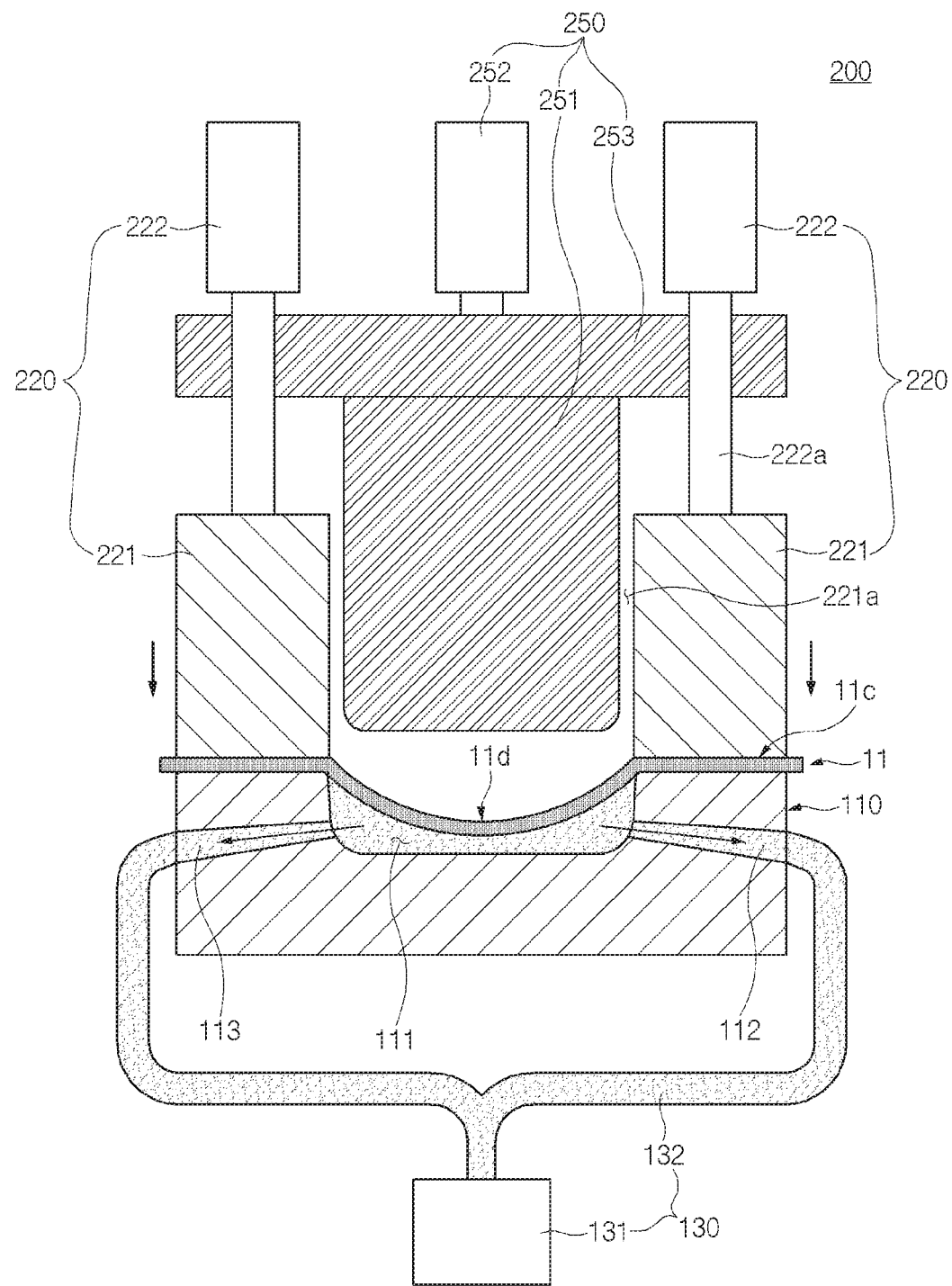
FIG. 13 is a cross-sectional view illustrating an example of a state in which the pouch sheet is elongated through the vacuum elongation process in the pouch forming method according to the third exemplary embodiment of the present invention.
Figure 14:
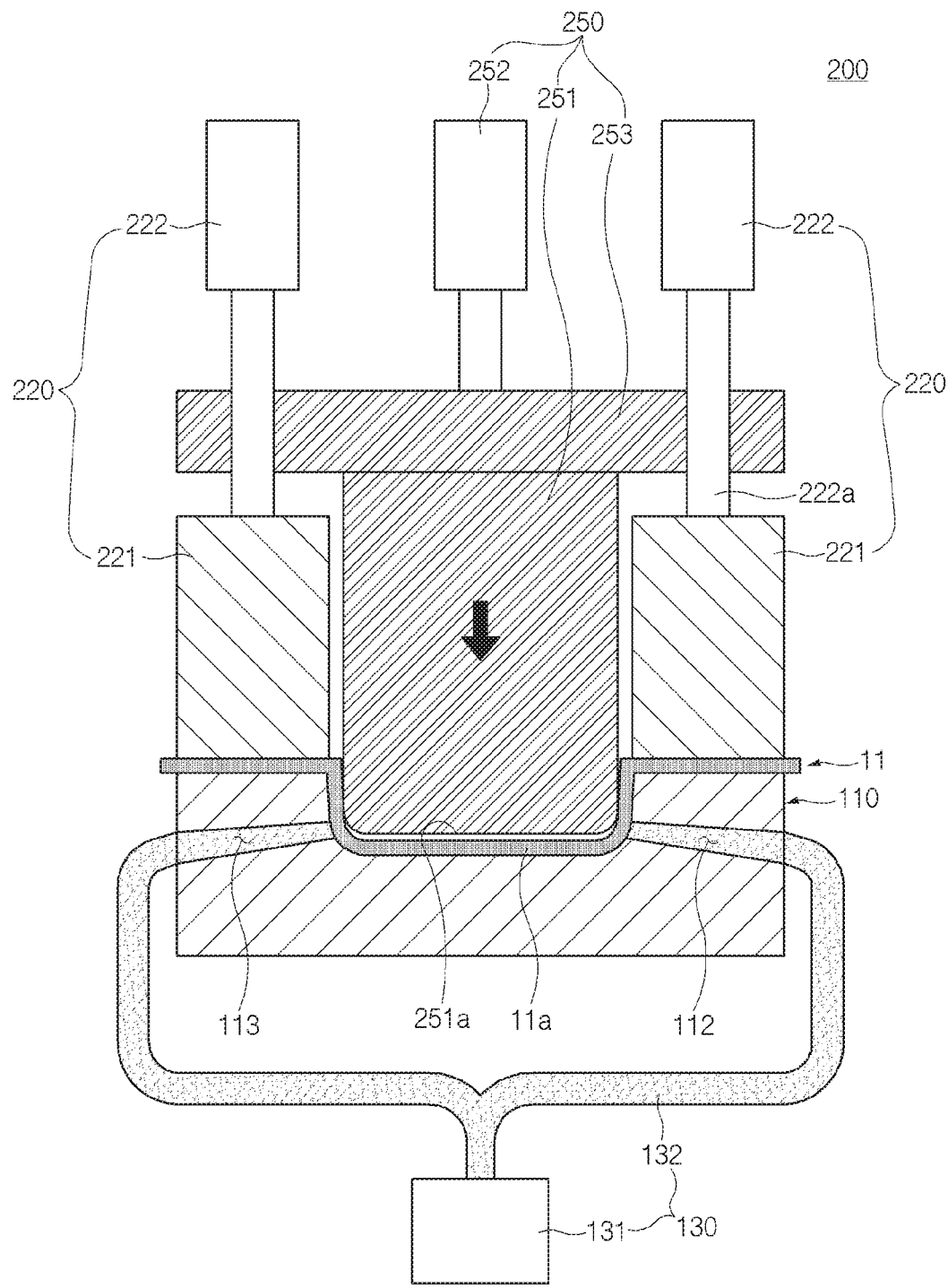
FIG. 14 is a cross-sectional view illustrating an example of an accommodation part formation process in the pouch forming method according to the third exemplary embodiment of the present invention.
Figure 15:
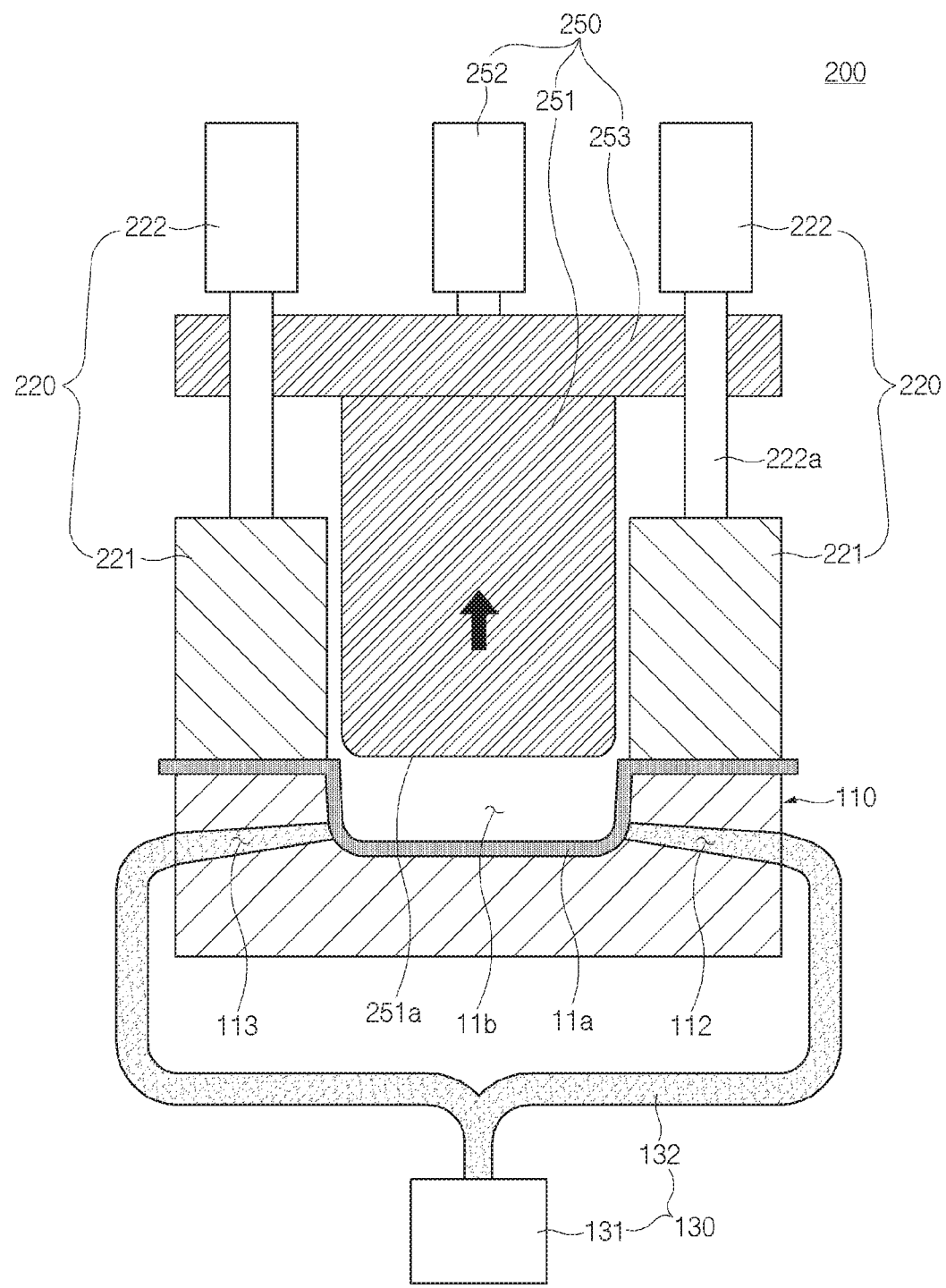
FIG. 15 is a cross-sectional view illustrating an example of a state in which an accommodation part is formed in the pouch sheet through the accommodation part formation process in the pouch forming method according to the third exemplary embodiment of the present invention.

Hereinafter, a pouch forming method according to a third exemplary embodiment of the present invention will be described. FIG. 12 is an exploded perspective view illustrating an example of a pouch forming device used in a pouch forming method according to a third exemplary embodiment of the present invention, and FIG. 13 is a cross-sectional view illustrating an example of a state in which the pouch sheet is elongated through the vacuum elongation process in the pouch forming method according to the third exemplary embodiment of the present invention. FIG. 14 is a cross-sectional view illustrating an example of an accommodation part formation process in the pouch forming method according to the third exemplary embodiment of the present invention, and FIG. 15 is a cross-sectional view illustrating an example of a state in which an accommodation part is formed in the pouch sheet through the accommodation part formation process in the pouch forming method according to the third exemplary embodiment of the present invention;

Referring to FIGS. 12 to 15, a pouch forming method for forming an accommodation part 11b that accommodates an electrode assembly in a pouch sheet 11 according to a third exemplary embodiment of the present invention may comprise a seating process of seating the pouch sheet 11 on a lower die 110 in which a forming groove 111 is formed, a pouch supporting process of supporting the pouch sheet 11 on the lower die 110 by a stripper 221, a vacuum elongation process of elongating a portion of the pouch sheet 11, in which the accommodation part 11b is formed, by vacuum, an accommodation part formation process of pressing the portion of the pouch sheet, which is elongated by the vacuum, using a punch 251 to form the accommodation part 11b, and a control process of controlling vertical movement of the stripper 221.

The pouch forming method according to the third exemplary embodiment of the present invention is different from the pouch forming method according to the foregoing first exemplary embodiment of the present invention and the pouch forming method according to the foregoing second exemplary embodiment of the present invention in that the control process is further performed. Thus, contents of this exemplary embodiment, which are duplicated with those according to the forgoing exemplary embodiment, will be omitted or briefly described, and also, differences therebetween will be mainly described.

In more detail, referring to FIGS. 1 and 13, in the pouch supporting process of the pouch forming method according to the third exemplary embodiment of the present invention, an outer portion 11c of the accommodation part 11b in the pouch sheet 11 may be pressed by the stripper 221 disposed above the pouch sheet 11 to be supported on the lower die 110. In the pouch supporting process, the outer portion 11c of the pouch sheet 11 may be pressed by the stripper 221 to support and fix the outer portion 11c of pouch sheet 11. Subsequently, by adjusting a pressing force of the stripper 221 through the control process, the position of the outer portion 11c of the pouch sheet 11 may be allowed to move when the punch 251 presses the pouch sheet 11.

In the vacuum elongation process, a lower portion of the pouch sheet 11, in which the accommodation part 11b is formed, may be elongated by vacuum. In the vacuum elongation process, a space of the forming groove 111 may be vacuumized through vacuum passages 112 and 113 connected to the forming groove 111 in the lower die 110 to elongate a portion of the pouch sheet 11, which faces the forming groove 111. Referring to FIGS. 14 and 15, in the accommodation part formation process, the portion of the pouch sheet 11, which is elongated by the vacuum, may be pressed by a punch 251 disposed above the pouch sheet 11 in a direction, in which the forming groove 111 is formed, to form the accommodation part 11b.

In the control process, a stripper moving part 222 for allowing the stripper 221 to vertically move may be controlled by a control unit (not shown). In addition, in the control process, when the punch 251 is inserted into the forming groove 111 of the lower die 110 to press the pouch sheet 11, the stripper moving part 222 may ascend to reduce the pressing force of the stripper 221 for pressing the pouch sheet. Furthermore, in the control process, the stripper moving part 222 and the punch moving part 252 that allows the punch 251 to move vertically may be controlled, and thus, the stripper 221 may gradually ascend (or the pressing force may be gradually decreased), and also, a descending speed of the punch 251 may be gradually reduced.

Figure 16:
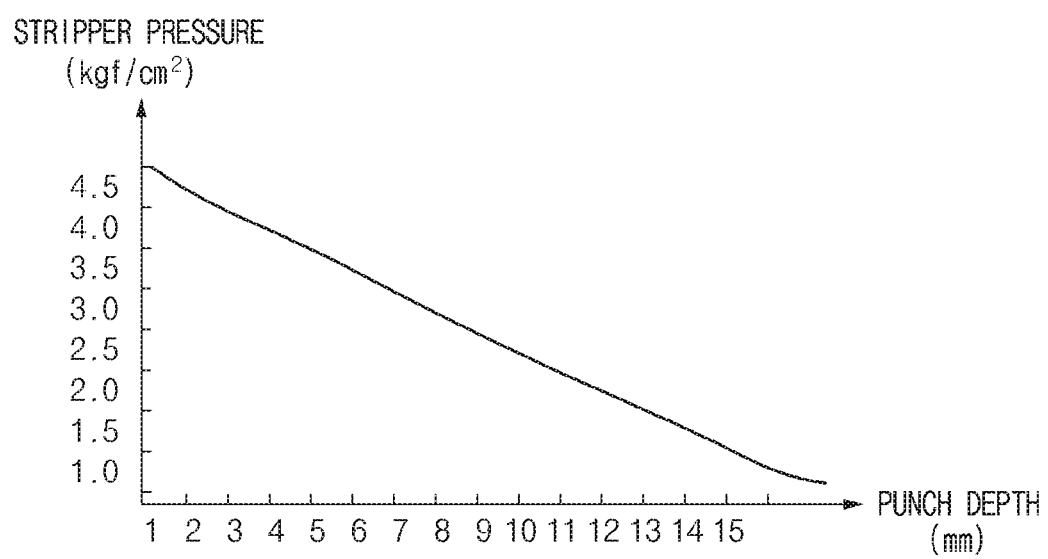
FIG. 16 is a graph illustrating a relationship between a pressing force and a forming depth of a stripper in the pouch forming method according to the third exemplary embodiment of the present invention.
Figure 17:
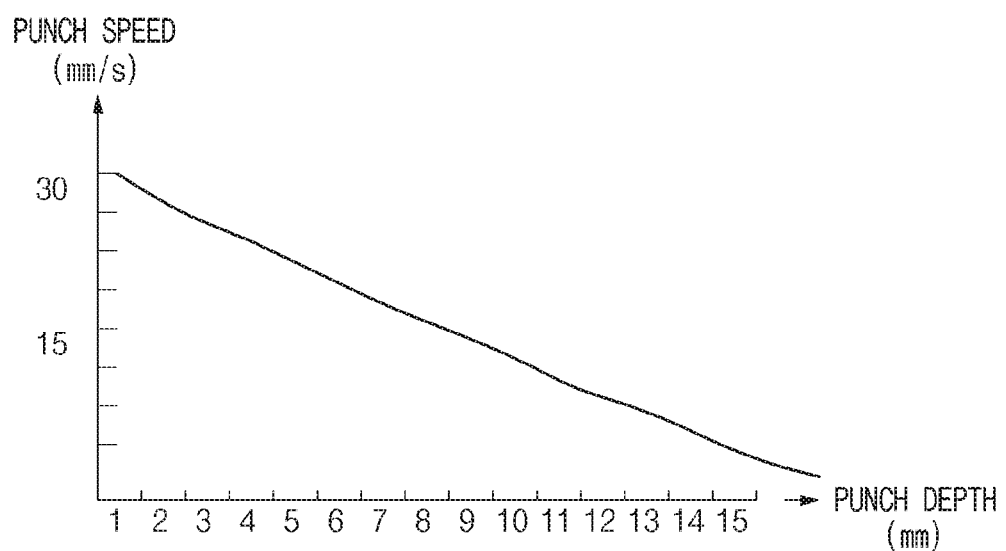
FIG. 17 is a graph illustrating a relationship between a descending speed and a forming depth of a punch in the pouch forming method according to the third exemplary embodiment of the present invention.

FIG. 16 is a graph illustrating a relationship between the pressing force and the forming depth of the stripper in the pouch forming method according to the third exemplary embodiment of the present invention, and FIG. 17 is a graph illustrating a relationship between the descending speed and the forming depth of the punch in the pouch forming method according to the third exemplary embodiment of the present invention. As shown in the graph of FIG. 16, in the control process, the pressing force of the stripper 221 and a depth at which the punch 251 is inserted into the forming groove 111 are inversely proportional to each other. In other words, as a depth of the punch 251 inserted into the forming groove 111 increases, the pressing force of the stripper 221 may gradually decrease to expand an elongation area of the pouch sheet 11. As a result, a local elongation of the pouch may be increased to prevent the cracks from occurring (see FIGS. 13 and 14).

Further, as illustrated in FIG. 17, in the control process, the descending speed of the punch 251 and the depth of the punch 251 inserted into the forming groove 111 are inversely proportional to each other. In other words, as the depth of the punch 251 inserted into the forming groove 111 increases, the descending speed, i.e., the pressing force of the punch 251 may gradually decrease to expand an elongation area of the pouch sheet 11. As a result, a local elongation of the pouch sheet 11 may be increased to prevent the cracks from occurring (see FIGS. 13 and 14).

Thus, referring to FIGS. 14 and 15, in the pouch forming method according to the third exemplary embodiment of the present invention, when the pouch sheet 11 is formed, the elongation may gradually increase to form the accommodation part 11b that accommodates the electrode assembly in the pouch sheet 11 without the occurrence of cracks, thereby enabling the pouch to be manufactured with an improved quality. Referring to FIG. 13, the forming portion 11d of the pouch sheet 11, in which the accommodation part 11b is formed, may be elongated by the vacuum and subsequently pressed by the punch 151 to form the pouch sheet 11, the occurrence of cracks in the forming portion may be more effectively prevented (see FIG. 1).

Hereinafter, a pouch forming method according to a fourth exemplary embodiment of the present invention will be described. Referring to FIGS. 1, 2, and 4 to 6, a pouch forming device 100 according to the fourth exemplary embodiment of the present invention may comprise a lower die 110 which is disposed below a pouch sheet 11 and in which a forming groove 11 is formed in an upper portion thereof, a punch unit 150 comprising a punch 151 that presses the pouch sheet 11 to form an accommodation part 11b having a shape that corresponds to the forming groove 111 in the pouch sheet 11, and a vacuum unit 130 that applies vacuum to the pouch sheet 11 to elongate a forming portion 11d of the pouch sheet 11. In addition, the pouch forming device 100 according to the fourth exemplary embodiment of the present invention may further comprise a stripper unit 120 that supports the pouch sheet 11 on the lower die 110.

The pouch forming device 100 according to the fourth exemplary embodiment of the present invention relates to a device for forming the pouch sheet 11, which is applied to the pouch forming method according to the foregoing first exemplary embodiment of the present invention and the pouch forming method according to the foregoing second exemplary embodiment of the present invention. Thus, in this exemplary embodiment, contents duplicated with those according to the foregoing embodiments will be briefly described, and differences therebetween will be mainly described.

In more detail, in the pouch forming device 100 according to the fourth exemplary embodiment of the present invention, the accommodation part 11b that accommodates the electrode assembly 12 may be formed in the pouch sheet 11. The electrode assembly 12 may be a chargeable and dischargeable power generation element and have a structure in which an electrode 12c and a separator 12d are combined and alternately stacked. The electrode assembly 12 may be accommodated in the pouch sheet 11 to constitute a secondary battery 10. In addition, in the secondary battery 10, an electrode lead 13 connected to the electrode 12c of the electrode assembly 12 to be electrically connected to an external device may be further provided.

The electrode 12c may comprise a positive electrode 12a and a negative electrode 12b. Further, the separator 12d may separate the positive electrode 12a from the negative electrode 12b to electrically insulate the positive electrode 12a from the negative electrode 12b. The positive electrode 12a may comprise a positive electrode current collector (not shown) and a positive electrode active material (not shown) applied to the positive electrode current collector, and the negative electrode 12b may comprise a negative electrode current collector (not shown) and a negative electrode active material (not shown) applied to the negative electrode current collector. For example, the positive electrode current collector may be provided as a foil made of an aluminum (Al) material. The positive electrode active material may comprise, for example, lithium manganese oxide, lithium cobalt oxide, lithium nickel oxide, lithium iron phosphate, or a compound containing at least one of these and mixtures thereof. For example, the negative electrode current collector may be provided as a foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof.

The separator 12d may include an insulation material and may be alternatively stacked with the positive electrode 12a and the negative electrode 12b. The separator 12d may be disposed between the positive electrode 12a and the negative electrode 12b and also disposed on an outer surface of each of the positive electrode 12a and the negative electrode 12b. The separator 12d may include, for example, a polyolefin-based resin film such as polyethylene or polypropylene having micropores.

The lower die 110 may be disposed below the pouch sheet 11, and a forming groove 111 may be formed in an upper portion of the lower side 110. Further, vacuum passages 112 and 113 that serve as passages through which the forming groove 111 and the vacuum unit 130 are connected to each other may be formed in the lower die 110.

Suction apertures 112a and 113a of the vacuum passages 112 and 113 may be connected to the forming groove 111 and disposed in a lower portion of a side surface of the forming groove 111. Thus, a forming portion of a corner of a body 11a, at which a large deformation of the pouch sheet 11 occurs may be effectively elongated. In other words, the suction apertures 112a and 113a of the vacuum passages 112 and 113 may be formed in the lower portion of the side surface of the forming groove 111, which faces a portion at which the corner is formed on the body 11a of the pouch sheet 11. Thus, when the corner of the body 11a of the pouch sheet 11 is formed, an adjacent portion may be sufficiently elongated to form the accommodation part 11b with a sufficient depth without an occurrence of cracks in the corner.

Further, the suction apertures 112a and 113a of the vacuum passages 112 and 113 may be provided in plurality along the lower portion of the side surface of the forming groove 111. Each of the vacuum passages 112 and 113 formed in the lower die 110 may have one side connected to the forming groove 111 and the other side connected to the vacuum unit 130. Each of the circular suction apertures 112a and 113a may be formed in the one side of each of the vacuum passages 112 and 113, and each of circular connection apertures 112b and 113b may be formed in the other side of each of the vacuum passages 112 and 113. Each of the vacuum passages 112 and 113 may have a shape that gradually decreases in diameter toward each of the suction apertures 112a and 113a. In other words, each of the vacuum passages 112 and 113 may form a circular passage and have a shape that gradually decreases in diameter from the other side toward the one side thereof. Thus, vacuum suction force in the vicinity of the suction apertures 112a and 113a of the vacuum passages 112 and 113 may be increased, and thus, the elongation of the pouch sheet 11 may be increased.

A stripper 121 may be disposed above the pouch sheet 11 to press an outer portion 11c of the accommodation part 11 in the pouch sheet 11 and to fix the pouch sheet 11 to the lower die 110. A stripper unit 120 may include the stripper 121 and a stripper moving part that allows the stripper 121 to move. A lower end of the stripper 121 may press the pouch sheet 11 to allow the outer portion 11c of the pouch sheet 11 to be engaged with the lower die 110, thereby preventing the pouch sheet 11 from moving when the portion of the pouch sheet 11, in which the accommodation part 11b is formed, is pressed by the punch 151.

The punch 151 may be disposed above the pouch sheet 11 to press the pouch sheet 11 in a direction of the forming groove 111 of the lower die 110, thereby forming the accommodation part 11b in a shape that corresponds to the forming groove 111 in the pouch sheet 11. A punch unit 150 may include the punch 151 and the punch moving part that allows the punch 151 to move. An end 151a of the punch 151 may be disposed at a position that faces the forming groove 111 of the lower die 110. The end 151a of the punch 151 may be inserted into the forming groove 111 of the lower die 110 to press the pouch sheet 11, thereby forming the accommodation part 11b. Further, the end 151a of the punch 151 may have a width less than a width of the forming groove 111 of the lower die 110. For example, a portion of the punch 151, which is inserted into the forming groove 111 of the lower die 110 and an inner surface of the forming groove 111 of the lower die 110 may be spaced from each other by a thickness that correspond to the pouch sheet 11.

The vacuum unit 130 may be connected to the forming groove 111 of the lower die 110 to apply vacuum to the pouch sheet 11 seated on a top surface of the lower die 110, thereby elongating the forming portion 11d of the pouch sheet 11. The vacuum unit 130 may comprise a vacuum pump 131. The vacuum unit 130 may further comprise a vacuum tube 132 which connects the vacuum pump 131 to the vacuum passages 112 and 113 of the lower die 110. Here, a space of the forming groove 111 of the lower die 110 may be connected to the vacuum pump 131 through the vacuum passages 112 and 131 and the vacuum tube 132 to allow the space of the forming groove 111 of the lower die 110 to be vacuumized by the vacuum pump 131. Thus, a portion of the pouch sheet 111, which covers the space of the forming groove 111 of the lower die 110, may be elongated. As a result, the occurrence of cracks in the elongated pouch sheet 11 may be prevented when being pressed by the punch 151.

Hereinafter, a pouch forming method according to a fifth exemplary embodiment of the present invention will be described. Referring to FIGS. 1, 2, and 12 to 15, a pouch forming device 200 according to the fifth exemplary embodiment of the present invention may comprise a lower die 110 which is disposed below a pouch sheet 11 and in which a forming groove 11 is formed in an upper portion thereof, a punch unit 250 comprising a punch 251 that presses the pouch sheet 11 to form an accommodation part 11b having a shape that correspond to the forming groove 111 in the pouch sheet 11, a vacuum unit 130 that applies vacuum to the pouch sheet 11 to elongate a forming portion 11d of the pouch sheet 11, and a stripper unit 220 comprising a stripper 221 that supports the pouch sheet 11 on the lower die 110.

The pouch forming device 200 according to the fifth exemplary embodiment of the present invention relates to a device for forming the pouch sheet 11, which is applied to the pouch forming method according to the foregoing third exemplary embodiment of the present invention. Thus, in this exemplary embodiment, contents duplicated with those according to the foregoing exemplary embodiments will be omitted or briefly described, and differences therebetween will be mainly described.

In more detail, in the pouch forming device 200 according to the fifth exemplary embodiment of the present invention, the accommodation part 11b that accommodates the electrode assembly 12 may be formed in the pouch sheet 11. The lower die 110 may be disposed below the pouch sheet 11, and a forming groove 111 may be formed in an upper portion of the lower side 110. Further, vacuum passages 112 and 113 that serve as passages through which the forming groove 111 and the vacuum unit 130 are connected to each other may be formed in the lower die 110. Suction apertures 112a and 113a of the vacuum passages 112 and 113 may be connected to the forming groove 111 and disposed in a lower portion of a side surface of the forming groove 111. Each of the vacuum passages 112 and 113 formed in the lower die 110 may have one side connected to the forming groove 111 and the other side connected to the vacuum unit 130.

The stripper unit 220 may comprise the stripper 221 that supports the pouch sheet 11 on the lower die 110 and a stripper moving part 222 that allows the stripper 221 to vertically move. The stripper 221 may be disposed above the pouch sheet 11 to press the outer portion 11c of the accommodation part 11 in the pouch sheet 11, thereby supporting the pouch sheet 11 on the lower die 110. For example, the stripper 221 may have a bottom surface having a size that corresponds to a size of the top surface of the lower die 110. An aperture 221a that vertically passes through the stripper 221 and has a size that corresponds to a size of the forming groove 111 of the lower die 110 may be formed in the stripper 221.

The stripper moving part 222 may allow the stripper 221 to vertically move and allow the punch 251 to descend, thereby supporting the pouch sheet 11. For example, the stripper moving part 222 may comprise a pneumatic or hydraulic actuator. The stripper moving part 222 may include a moving rod 222a at a lower portion thereof for allowing the stripper 221 to move.

The punch unit 250 may comprise a punch 251 that forms the accommodation part 111b in the pouch sheet 11 in a shape that corresponds to the forming groove 111 of the lower die 110 and a punch moving part 252 that allows the punch 251 to move vertically. The punch unit 250 may further comprise a punch plate 253 that connects the punch 251 to the punch moving part 252. The punch 251 may be disposed above the pouch sheet 11 to press the pouch sheet 11 in the direction of the forming groove 111 of the lower die 110, thereby forming the accommodation part 11b in the pouch sheet 11 in a shape that corresponds to the forming groove 111 of the lower die 110. An end 251a of the punch 251 may be disposed at a position that faces the forming groove 111 of the lower die 110. The end 251a of the punch 251 may be inserted into the forming groove 111 of the lower die 110 to press the pouch sheet 11, thereby forming the accommodation part 11b.

The punch moving part 252 may allow the punch 251 to vertically move, e.g., to descend, thereby pressing the pouch sheet 11. For example, the punch moving part 252 may comprise a pneumatic or hydraulic actuator. The punch plate 253 may be provided as a plate that is disposed on an upper end of the punch 251 to further extend in a horizontal direction. The punch moving part 252 may allow the punch plate 253 to vertically move to move the punch 251. For example, the punch 251 and the punch plate 253 may be integrally formed.

The vacuum unit 130 may be connected to the forming groove 111 of the lower die 110 to apply vacuum to the pouch sheet 11 seated on a top surface of the lower die 110, thereby elongating the forming portion 11d of the pouch sheet 11.

A control unit (not shown) may adjust a pressing force of the stripper 221, which presses the pouch sheet 11. In addition, the control unit may control the stripper moving part 222 to allow the stripper 221 to ascend when the punch 251 is inserted into the forming groove 111 to press the pouch sheet 11 to reduce the pressing force of the stripper 221, which presses the pouch sheet 11. The control unit may control the punch moving part 252 and the stripper moving part 222. The control unit may be electrically connected to the punch moving part 252 and/or to the stripper moving part 222. The control unit may control the punch moving part 252 to cause the stripper 221 to gradually ascend and simultaneously control the stripper moving part 222 to cause a descending speed of the punch 251 to gradually decrease.

Experimental Example 1

FIG. 18 is a table showing results obtained from Experimental Example 1 in a pouch forming device according to a fourth exemplary embodiment of the present invention.

Comparative Example 1

In Comparative Example 1, an accommodation part that accommodates an electrode assembly is formed in a pouch sheet using a pouch forming device comprising a lower die, a stripper, and a punch. In other words, the pouch sheet is formed using the constituents except the vacuum unit in the pouch forming device according to the fourth exemplary embodiment of the present invention.

Manufacturing Example 1

In Manufacturing Example 1, an accommodation part that accommodates an electrode assembly is formed in a pouch sheet using a pouch forming device comprising a lower die, a punch, a stripper, and a vacuum unit. In other words, the pouch sheet is formed using the constituents of the pouch forming device according to the fourth exemplary embodiment of the present invention.

In Comparative Example 1 and Manufacturing Example 1, the same pouch sheet is used, and the pouch sheet is formed under a substantially same environment. In particular, the same environment may refer to a pressure of the stripper: 4 kg/cm², an initial descending speed of the punch: 30 mm/s, and a surface roughness of the punch: 0.1 s.
Elongation A table in FIG. 18 is obtained as a result of measuring whether the pouch sheet formed through Comparative Example 1 and Manufacturing Example 1 is defective.

Referring to the result in the table of FIG. 18, in Comparative Example 1, wrinkles and cracks occur in the pouch sheet when the punch descends by 8 mm or more from the uppermost end of the forming groove of the lower die. In contrast, in Manufacturing Example, wrinkles and cracks occur in the pouch sheet when the punch descends by 10 mm or more from the uppermost end of the forming groove of the lower die.

In summary, in Manufacturing Example 1, the wrinkles and the cracks occur after the punch descends by 2 mm more than in Comparative Example 1. From the above experimental results, it is confirmed that the elongation can be increased more in Manufacturing Example 1 than in Comparative Example 1.

Experimental Example 2

FIG. 19 is a table showing results obtained from Experimental Example 2 in a pouch forming device according to a fifth exemplary embodiment of the present invention.

Comparative Example 2

In Comparative Example 2, an accommodation part that accommodates an electrode assembly is formed in a pouch sheet using a pouch forming device comprising a lower die, a stripper, and a punch. In other words, the pouch sheet is formed using the constituents except the vacuum unit and the control unit in the pouch forming device according to the fifth exemplary embodiment of the present invention.

Manufacturing Example 2

In Manufacturing Example 2, an electrode assembly accommodation part is formed in a pouch sheet using a pouch forming device comprising a lower die, a stripper, a punch, a vacuum unit, and a control unit. In other words, the pouch sheet is formed using the constituents of the pouch forming device according to the fifth exemplary embodiment of the present invention.

In Comparative Example 2 and Manufacturing Example 2, the same pouch sheet is used, and the pouch sheet is formed under a substantially same environment. The same environment may refer to a pressure of the stripper member: 4 kg/cm², an initial descending speed of the punch: 30 mm/s, a pressure inverse proportion control rate: 95%, and a surface roughness of the punch: 0.1 s.
Elongation The table in FIG. 19 is obtained as a result of measuring whether the pouch sheet formed through Comparative Example 2 and Manufacturing Example 2 is defective.

Referring to the result in the table of FIG. 19, in Comparative Example 2, wrinkles and cracks occur in the pouch sheet when the punch descends by 8 mm or more from the uppermost end of the forming groove of the lower die. In contrast, in Manufacturing Example 2, wrinkles and cracks occur in the pouch sheet when the punch descends by 13 mm or more from the uppermost end of the forming groove of the lower die.

In summary, in Manufacturing Example 2, the wrinkles and the cracks occur after the punch descends by 5 mm more than in Comparative Example 2. From the above experimental results, it is confirmed that the elongation can be increased more in Manufacturing Example 2 than in Comparative Example 2.

According to the present invention, when the punch presses the pouch sheet to form the accommodation part that accommodates the electrode assembly, vacuum may be applied to elongate the portion of the pouch, at which the accommodation part is formed, thereby preventing cracks from occurring.

In addition, according to the present invention, the pressing force of the stripper that supports the pouch sheet may be gradually decreased, and/or the descending speed of the punch may be gradually decreased to increase the elongation when the pouch is formed, and thus, the pouch may be formed more stably. Particularly, when the pouch is formed, the local portion, i.e., the edge or vertex portion of the electrode assembly accommodation part formed in the pouch may be more effectively prevented from cracking.

While the present invention has been particularly shown and described with reference to exemplary embodiments thereof, it is to be understood that the scope of the present invention is not limited to the pouch forming method and the pouch forming device according to the present invention. It will be understood by those of ordinary skill in the art that various changes in form and details may be made therein without departing from the spirit and scope of the invention. Furthermore, the scope of protection of the present invention will be clarified by the appended claims.

What is claimed is:

1. A pouch forming method for forming an accommodation part that accommodates an electrode assembly in a pouch sheet, the pouch forming method comprising:
    a seating process of seating the pouch sheet on a top surface of a lower die in which a forming groove is formed in an upper portion thereof;
    a vacuum elongation process of elongating a lower portion of the pouch sheet, in which the accommodation part is formed, by vacuum;
    an accommodation part formation process of pressing an upper portion of the pouch sheet, which is opposite the lower portion of the pouch sheet elongated by the vacuum, using a punch disposed above the pouch sheet to press the upper portion of the pouch sheet in a direction in which the forming groove is formed to a depth of between 8 mm and 12 mm below the top surface of the lower die to form the accommodation part;
    a pouch supporting process of pressing an outer portion of the accommodation part by a stripper disposed on the upper portion of the pouch sheet to support the pouch sheet on the lower die; and
    a control process of controlling a stripper moving part, which allows the stripper to vertically move, by a control unit,
    wherein, in the vacuum elongation process, a space of the forming groove is vacuumized through a vacuum passage connected to the forming groove in the lower die to elongate the lower portion of the pouch sheet, wherein the lower portion of the pouch sheet faces the forming groove, wherein, in the vacuum elongation process, the space of the forming groove is vacuumized through a plurality of suction apertures of the vacuum passage, which are formed along a lower portion of a side surface of the forming groove, to elongate the lower portion of the pouch sheet, and wherein, in the control process, the control unit controls gradual ascension of the stripper moving part, away from the lower die, and wherein a pressing force that presses the upper portion of the pouch sheet is gradually reduced throughout the entire accommodation part formation process.

2. The pouch forming method of claim 1, wherein the vacuum elongation process is performed prior to the accommodation part formation process.

3. The pouch forming method of claim 1, wherein the vacuum elongation process and the accommodation part formation process are performed simultaneously.

4. The pouch forming method of claim 1, wherein, in the control process, the stripper moving part and a punch moving part that allows the punch to vertically move are controlled to cause the stripper to gradually ascend, and simultaneously, a descending speed of the punch to gradually decrease.

* * * * *